United States Patent
Naubert et al.

(10) Patent No.: US 9,365,286 B2
(45) Date of Patent: Jun. 14, 2016

(54) REVERSIBLE DECOUPLING DEVICE FOR ACTUATORS

(71) Applicant: Airbus Defence and Space GmbH, Ottobrunn (DE)

(72) Inventors: Alexander Naubert, Stuttgart (DE); Markus Christmann, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/488,620

(22) Filed: Sep. 17, 2014

(65) Prior Publication Data

US 2015/0075940 A1 Mar. 19, 2015

(30) Foreign Application Priority Data

Sep. 18, 2013 (EP) .................................... 13004558

(51) Int. Cl.
*B64C 13/42* (2006.01)
*B64C 27/605* (2006.01)
*F16H 25/20* (2006.01)
*F16H 25/22* (2006.01)

(52) U.S. Cl.
CPC ............... *B64C 13/42* (2013.01); *B64C 27/605* (2013.01); *F16H 25/205* (2013.01); *F16H 25/2204* (2013.01); *F16H 2025/2071* (2013.01); *F16H 2025/2081* (2013.01)

(58) Field of Classification Search
None
See application file for complete search history.

(56) References Cited

U.S. PATENT DOCUMENTS

| 4,685,550 A * | 8/1987 | Metcalf | F16D 27/118 192/101 |
| 5,802,691 A * | 9/1998 | Zoltaszek | B21J 15/26 222/390 |
| 8,070,091 B2 * | 12/2011 | Benson | B64C 27/605 244/17.13 |

* cited by examiner

*Primary Examiner* — Richard Lorence
(74) *Attorney, Agent, or Firm* — Crowell & Moring LLP (57) ABSTRACT

A reversible decoupling device is connected to an electromechanical actuator. The reversible decoupling device has an energy storage element configured to store the energy required for a decoupling in the decoupling device. The decoupling device can be re-coupled again after a completed test run so that the decoupling functionality can be easily tested.

13 Claims, 6 Drawing Sheets

REVERSIBLE DECOUPLING DEVICE FOR ACTUATORS

CROSS-REFERENCE TO RELATED APPLICATIONS

The present application claims priority under 35 U.S.C. §119 to European patent application 13004558.6-1752, filed Sep. 18, 2013, the entire disclosure of which is herein expressly incorporate by reference.

BACKGROUND AND SUMMARY OF THE INVENTION

Exemplary embodiments of the present invention relate to aircraft technology. In particular, exemplary embodiments of the present invention relate to actuator technology for the aerodynamically effective elements of an aircraft. Exemplary embodiments of the present invention further particularly relate to a reversible decoupling device, an actuator element, an actuator array, and to an aircraft, particularly an airplane or helicopter.

Actuators are used in aircraft to mechanically move elements of the aircraft and to change the position, that is, location thereof. With airplanes, these are, for example, rudder areas, or elements of the wings, in order to influence the buoyancy behavior of the airplanes. With helicopters, this can influence the different rotor blade pitch by means of a swash plate, for example.

These types of actuators are typically configured as hydraulic elements since this technology has been controllable for a long time and is not very error-prone. Most often, conventional hydraulic actuators can still be moved in the event of malfunction, in other words, they do not block in the event of malfunction.

Due to the increasing electrification of aircraft it is desirable to replace hydraulic actuators, which possibly require a hydraulic system extending through the entire aircraft, with electrical actuators. The latter can be supplied purely electrically, wherein such electrical lines are usually easier to install in an aircraft than hydraulic lines, for example. Generating a movement of such an electrical actuator can now also be realized purely electrically, for example, with the aid of a suitable drive by way of an electric motor, or a local hydraulic system can be provided on the actuator, in particular a hydraulic system arranged in the actuator system, which likewise has to be only externally supplied with electrical energy.

Figure 1A:
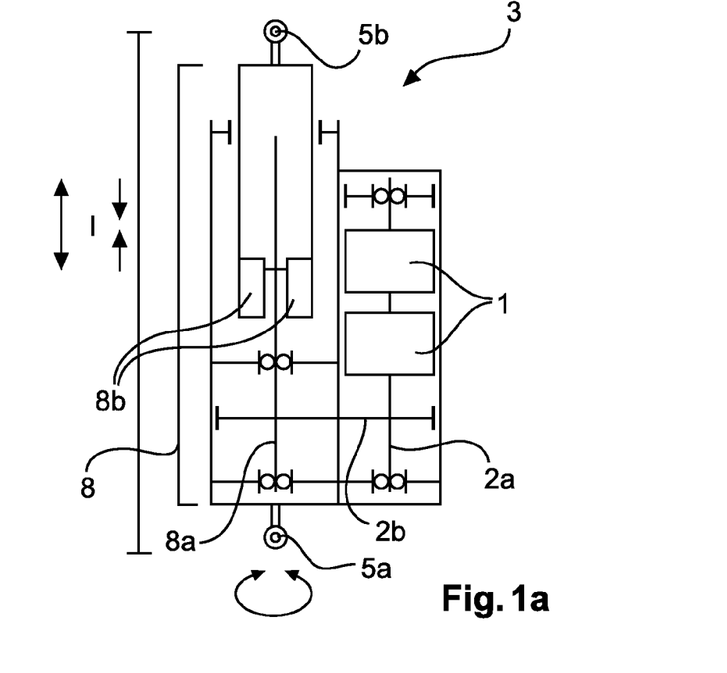
FIGS. 1a,b show a schematic illustration of an electromagnetic actuator according to the present invention.

FIG. 1a shows a schematic illustration of an electromechanical actuator.

As an example, two motor elements 1 are connected to the drive unit 8 of the actuator element 3 using a suitable connection consisting of a motor shaft 2a and a suitable transmission 2b. The drive unit 8 can be altered with respect to its length 1, particularly with respect to its distance between the two connection points 5a,b, so that a change in length of the drive unit 8 of the actuator element 3 changes the distance between the connection points 5a,b. By means of a suitable fixation between elements, a moving or tilting of an aerodynamically effective structure is thus possible, for example. The drive unit 8 is comprised of a first drive element 8a and a second drive element 8b, configured, for example, as a ball screw drive 8 with ball threaded nut 8b and ball threaded spindle 8a, or a planetary roller threaded drive 8a with roller elements, in particular balls or planetary rollers. By way of a rotation of the ball threaded spindle 8a, the ball threaded nut 8b can be moved thereon so that the rotation of the ball threaded spindle 8a provides a length change of the drive unit 8, and thus the actuator element 3, that is, a change of the distance between the connection points 5a, b. In the event of a defect of an actuator element, particularly with mission critical aerodynamically effective surfaces, it must be made sure that they still can be at least moved despite the defect. In the event of the failure of an actuator element, a certain redundancy is most often provided, depending on the particular use. In the case of control units or rudders, a second actuator element can be arranged force parallel to the first one, for example, so that the position change of the aerodynamically effective surface can be realized by one of the two actuator elements, or by both together.

If one actuator element of the two parallel actuator elements fails, the other one can at least maintain the function. Of particular relevance in this context are, however, defects of actuator elements, which thereafter make it no longer possible to carry out a change in length; for example, the fracture of a ball of the ball screw drive, can possibly block the ball threaded spindle and the ball threaded nut with respect to one another so that a length change of the actuator element is no longer possible. In such a case, control of the aerodynamically effective surface also is not carried out by the parallel arranged actuator element. In the worst case scenario, the airplane could no longer be controlled for that reason, and could possibly crash. In order to continue to be able to change the length of the electromechanical actuator elements, even in the event of a malfunction, decoupling devices or decoupling mechanisms can be integrated in the actuator elements, which in the event of a malfunction allow such a decoupling so as to be able to continue to summon up a suitable force, at least by way of an external power supply, for example, by way of an actuator element arranged in a force-parallel manner, in order to keep the aerodynamically effective surface operational while at the same time, the defective actuator element is changed in its length due to the external force, and thus does not block the movement of the aerodynamically effective surface.

Figure 1B:
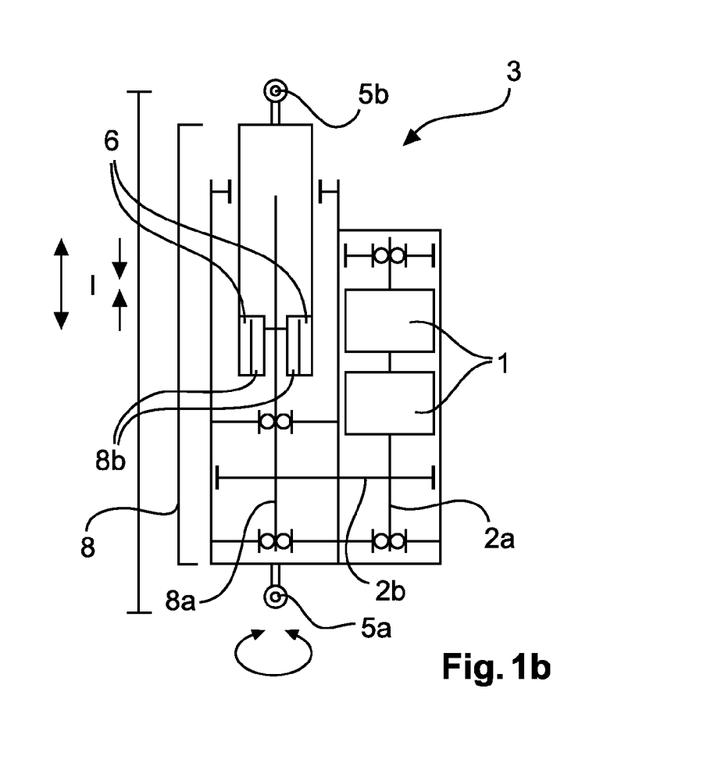

FIG. 1b shows an exemplary embodiment of an actuator element such as this. Ultimately, the only difference between the embodiments of FIG. 1b and FIG. 1a is the decoupling device 6. The decoupling device 6 does not merely decouple the two drive elements 8a,b from one another, rather, a decoupling is carried out such that a decoupling of the engagement points 5a, b takes place, wherein one of the engagement points is essentially connected to the two drive elements of the drive unit, even in a decoupled state, whereas the connection of one drive element to the second engagement point 5b is disengaged. Thus, the length of an actuator element can change independently of whether or not a mechanism of the drive unit, for example, the first drive element 8a to the second drive element 8b, is blocked.

Exemplary embodiments of the present invention are directed to a decoupling device for an actuator element.

Since the decoupling device for electromechanical actuator elements is a mission critical device, which if not functioning leads, in the worst possible case, to the crash of the aircraft, it is important that the decoupling device can be cyclically inspected for its correct functional capability.

According to a first embodiment of the present invention, a reversible decoupling device for an actuator element having a drive unit, provided with a first drive element and a second drive element is provided, wherein the first drive element and the second drive element interact functionally in order to effect a change in length of the actuator element, the decoupling device is provided with a decoupling mechanism having a drive element, a first force element, a second force element, a first form-fit element and a second form-fit element, wherein the first force element is configured to keep the first form-fit element in a closed position, wherein the drive element is configured to move the first form-fit element from the closed position to a form-fit released position, wherein the second force element is configured to move the second form-fit element from a closed position to a form-fit released position, wherein the second force element is blocked by the positive fit of the first form-fit element such that the second form-fit element cannot be put into the released position, and wherein the second force element can put the second form-fit element into its released position upon released positive fit of the first form-fit element, wherein the decoupling mechanism functionally decouples the decoupling device from a drive element of the actuator element so that the length change of the actuator element is made possible independently of the drive unit, particularly without functional decoupling from the first drive element and the second drive element.

According to a further embodiment of the present invention, an actuator element is provided with a drive unit having a first drive element and a second drive element, wherein the first drive element and the second drive element functionally interact so as to effect a length change of the actuator element, and wherein the actuator element is provided with a decoupling device according to the present invention.

According to a further embodiment of the present invention, an actuator array is provided having at least two actuator elements according to the invention, in particular four actuator elements according to the invention, wherein the at least two actuator elements according to the invention, in particular four actuator elements according to the invention, are arranged in a force-parallel manner, and wherein the at least two actuator elements according to the invention, in particular four actuator elements according to the invention, jointly provide a position interference, particularly in three degrees of freedom, of an aerodynamically effective element.

According to a further embodiment of the present invention, an aircraft, in particular airplane or helicopter, is disclosed, having an actuator element according to the present invention and/or an actuator array according to the present invention, for driving an aerodynamically effective element.

Most often, conventional actuator elements for controlling aerodynamically effective elements either have no decoupling device at all or possibly have one that only allows an irreversible decoupling, that is, a decoupling that can only be re-coupled with an increased expenditure of work. However, with conventional decoupling devices of this type, a regular test is not possible because such a test, the executed decoupling, would regularly lead to increased maintenance expenditure after the test. Thus, it can ultimately never be guaranteed with conventional decoupling devices that they will function flawlessly in an emergency.

In contrast thereto, with the present invention, a decoupling device for an actuator element is provided, which after a triggering, thus a decoupling, can be returned to the coupled state in a simple way. Thus, such a reversible decoupling device can be tested regularly for its correct functionality, for example, during a detailed test prior to operating the aircraft.

In order to decouple the actuator element, an energy store is provided in the decoupling device, for example, a suitably designed force element, a spring, for example, which supplies the energy, that is, force, necessary for the decoupling. The decoupling device of the present invention allows a replenishing of this energy store after an executed test, that is, an executed decoupling, by means of suitable measures so that thereafter, the energy can be used for a further decoupling process.

In order to initiate a decoupling, a trigger force or torque is required, which in a first approximation is proportional to the load on the actuator to be decoupled. Typically, a re-coupling requires much lower forces because it can be done without load. According to the invention, the decoupling is now supported by an energy store, a pressure spring, a pneumatic tank, or the like. The trigger force or the torque, which can be applied, for example, by way of a drive element like electric motor, electromagnet, or actuator based on shape memory alloys, only has to make the release of the store energy possible but does not need to supply the energy itself. A recoupling after testing the decoupling device may be done, according to the invention, by means of the main drive of the redundant actuator(s), for example, the tensioning of a spring by driving the actuator against an end stop, and thus introducing external energy to the actuator element, that is, the decoupling device, which can be stored in the force element by way of suitable means. Thus, the decoupling function can be tested in an automated manner, wherein the recoupling can be done either manually or in an automated manner by way of a suitable device.

The recharging of the energy store, for example, the tensioning of the spring used therefor, can be done by way of a targeted stretching or over-stretching of an actuator element. For example, in the case of utilizing the actuator elements on a helicopter swash plate, the swash plate, which must be capable of being positioned in three degrees of freedom, can be actuated by more than three, for example, four actuator elements. Since normally, only three actuator elements would be necessary for a positioning, such a system with four or more operative actuator elements is overdeterminate, which, however, at the same time allows the failure of one or more actuators without the positioning of such a swash plate being adversely affected. Thus, during a ground test prior to the flight operation, one of the actuator elements could be decoupled and thereby be tested for its functional capability. By suitable measures by the swash plate, the actuator can be re-coupled after the test, and thus, its energy store can be recharged, for example, by suitable positioning and force application by way of the remaining three functional actuators of the swash plate.

Particularly preferred is the embodiment of a decoupling device according to the invention in a two-stage mechanism. For example, the energy output of the actual force element for decoupling using suitable means, for example, by a positive fit, can be blocked without the need for a corresponding counterforce or holding force to be permanently supplied by a further element. In the case of a decoupling, the positive fit, in turn, must be released by way of a suitable mechanism so that the force element for decoupling can put its force action into effect. The retaining or releasing of the positive fit can thereby be carried out with substantially lower energy expenditure than would be necessary for permanently retaining the force element used for the decoupling, for example.

According to a preferred embodiment of the present invention, the drive element of the decoupling device may counteract the first force element. As a result, the first force element may secure the positive fit of the first form-fit element on the one hand, by keeping the first form-fit element in a closed position, whereas the drive element counteracts the force effect of the first force element in order to release the positive fit. Thus, the drive element can be configured such that it has only one effective direction while the reversed effective direction needed for recoupling the decoupling device is ensured by the first force element.

According to a further preferred embodiment of the present invention, in a closed position, the second form-fit element may provide a positive fit between a drive element of the actuator element and the decoupling device. It is thereby provided that the decoupling device is in form-fit connection with a drive element of the actuator element. The drive element of the actuator element interacting with the drive unit is not affected by a released positive fit. In other words, a released positive fit of the second form-fit element does not trigger a direct effect on the drive unit itself, with the result that the positive fit can also be released in the event that, for example, the first drive element and the second drive element of the actuator element themselves are the defect, blocked with respect to one other, for example.

According to a further exemplary embodiment of the present invention, the drive element of the decoupling device may be configured as an electromagnetic drive element, the first force element may be configured as a spring element, the second force element may be configured as a spring element, the first form-fit element may be configured as one or more ball elements, and/or the second form-fit element may be configured as one or more ball elements. Such configurations of the respective elements allow a structurally simple construction of the decoupling device.

According to a further preferred embodiment of the present invention, the actuator element may be provided with two connection points, the spacing thereof can be fixed by the length change of the actuator element, wherein one of the drive elements is connected to one of the connection points, essentially with immediate effect, and wherein the decoupling device is connected to the other connection point, essentially with immediate effect. In this way, it is ensured that in the event of a defect in the drive unit, for example, a blockage of the first drive element and second drive element of the actuator element with respect to one another, a decoupling of the actuator element can still be carried out such that by way of external power supply, a length change of the actuator elements can be brought about. In the event that, for example, the decoupling device would decouple the first drive element and the second drive element from one another, it is possible that it could not guarantee its function with a blockage of the two drive elements of the actuator element with respect to each other.

According to a further preferred embodiment of the present invention, the distance of the two connection points in a coupled state of the decoupling device may be adjustable by means of the actuator element, wherein the distance of the two connection points in a decoupled state of the decoupling device can be changed from the outside by an external application of force onto the connection points. It may be ensured in this way that in the event of a defect of the actuator element, it can be decoupled and subsequently, behaves essentially passively so that force parallel or effect parallel arranged actuator elements can essentially operate unaffected by the defective, decoupled actuator element.

According to a further preferred embodiment of the present invention, the actuator element may be of a minimum or maximum length, which it can assume by using its own drive unit, that is, during normal flight operation, wherein in a decoupled state, the actuator element can be shorted beyond the minimal length, or can be elongated beyond the maximal length by means of external power supply, wherein the decoupling device is designed such that at a length shortened and/or extended by external power supply, it can be transitioned from the decoupled state to the coupled state, in particular, wherein as a result of the external power supply, the second force element can be transitioned from a first, expanded state, in which the positive fit of the second form-fit means is released, to a second, compressed state, in which second, compressed state, the second form-fit means can be transitioned into the closed position. In this way, the energy initially required for the decoupling, which was stored in the second force element, can be recycled from the outside to the actuator element, and in particular, to the second force element after a decoupling so that the second force element stores this energy again.

According to a further preferred embodiment of the present invention, with the decoupled decoupling mechanism due to the external power supply and the compression of the second force element resulting therefrom, the first force element that was previously compressed by means of the drive unit in order to make the decoupling possible may be stretchable again so that the first force element is stretched, and the first form-fit element is transitioned from the released position to the closed position. In this manner, after introducing the energy into the second force element of the decoupling mechanism, the decoupling device may be influenced such that the positive fit of the first form-fit element for holding the second force element can be re-established. The energy in the second force element is essentially held by the first positive fit without external energy supply and is available for a further decoupling.

According to a further preferred embodiment of the present invention, the drive unit may be configured as a ball screw drive, wherein the first drive element and the second drive element may be configured as ball threaded spindle and ball screw nut of the ball screw drive. Alternative embodiments may be realized using a planetary roller screw drive or trapezoidal screw drive. A ball screw drive may thereby be a preferred option to bring about the change in length of an actuator element, whereas a drive unit configured in this way may have sufficient stability and may transfer a suitably large force.

According to a further preferred embodiment of the present invention, in the event of a defect of a drive unit of an actuator element, the decoupling device may trigger the decoupling mechanism of the actuator element so that the actuator element is functionally decoupled, wherein the position interference, in particular the three-dimensional position interference, of the aerodynamically effective element continues to be provided by the second actuator element, particularly the at least three, functional actuator elements. For example, in the case of a helicopter swash plate provided with more than three, for example, four actuator elements, there is normally only a system of three actuator elements needed for the adjustment of the position of the swash plate movement actuator in the three existing degrees of freedom so that the provision of additional actuator elements overdetermines the system. Although the additional actuator elements may positively contribute with respect to the total force to be applied, the pure positioning of the swash plate using three actuator elements is essentially just as feasible. Thus, the function of one or even several defective actuator elements can essentially be completely assumed and compensated for by at least three remaining functional actuator elements. Thus, in the event of a defect of one or several actuator elements, they can be decoupled so that they can no longer make a force contribution to the position of the swash plate while the functional capability of the aircraft, that is, the helicopter, and thus the positioning capability of the swash plate continues to be ensured by the remaining at least three functioning actuator elements

BRIEF DESCRIPTION OF THE DRAWING FIGURES

Exemplary embodiments of the invention are explained in more detail below with reference to the attached drawings, wherein.

DETAILED DESCRIPTION

Figure 2A:
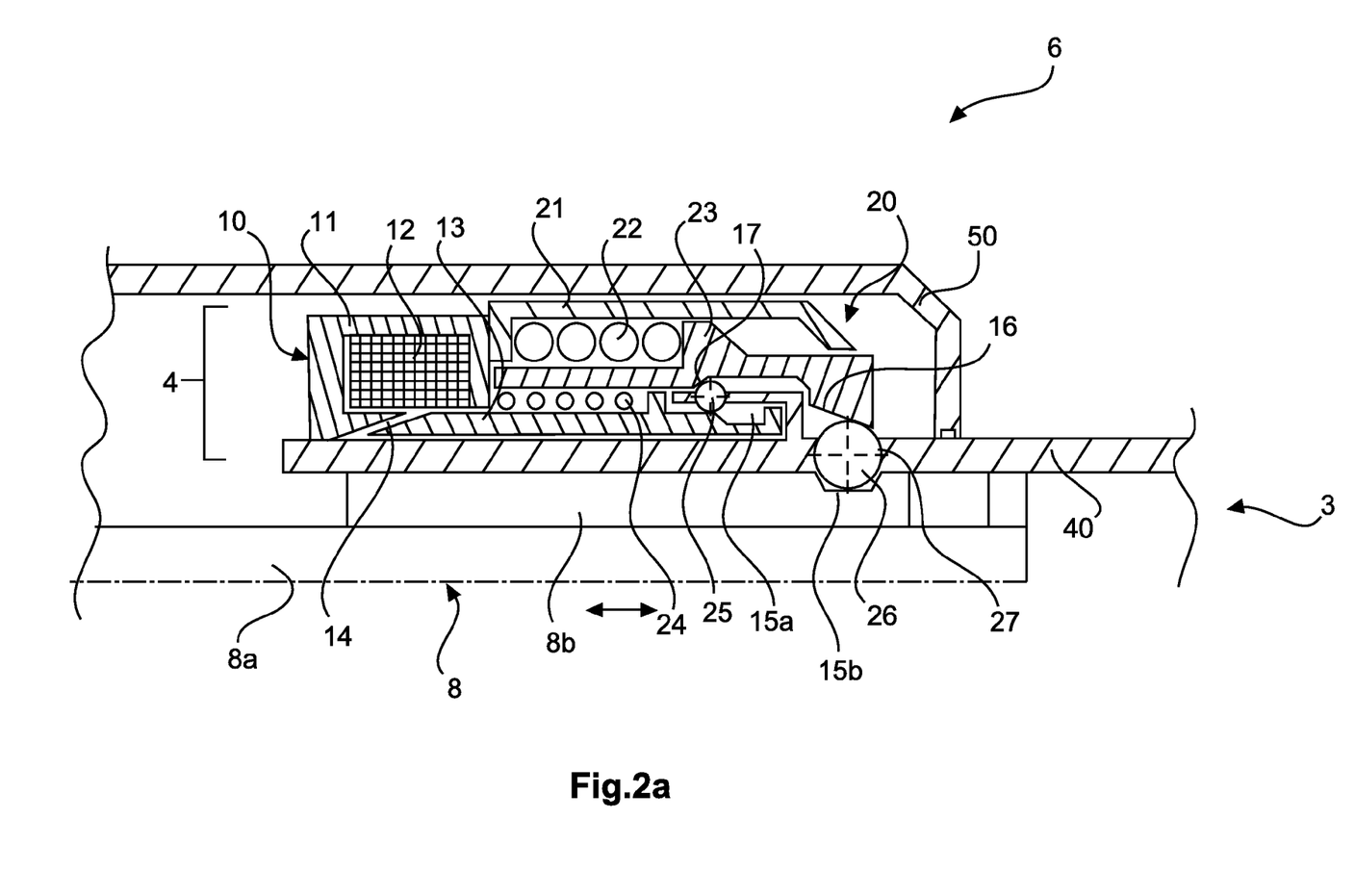
FIGS. 2a-c show various states of an exemplary embodiment of a decoupling device according to the present invention.
Figure 2B:
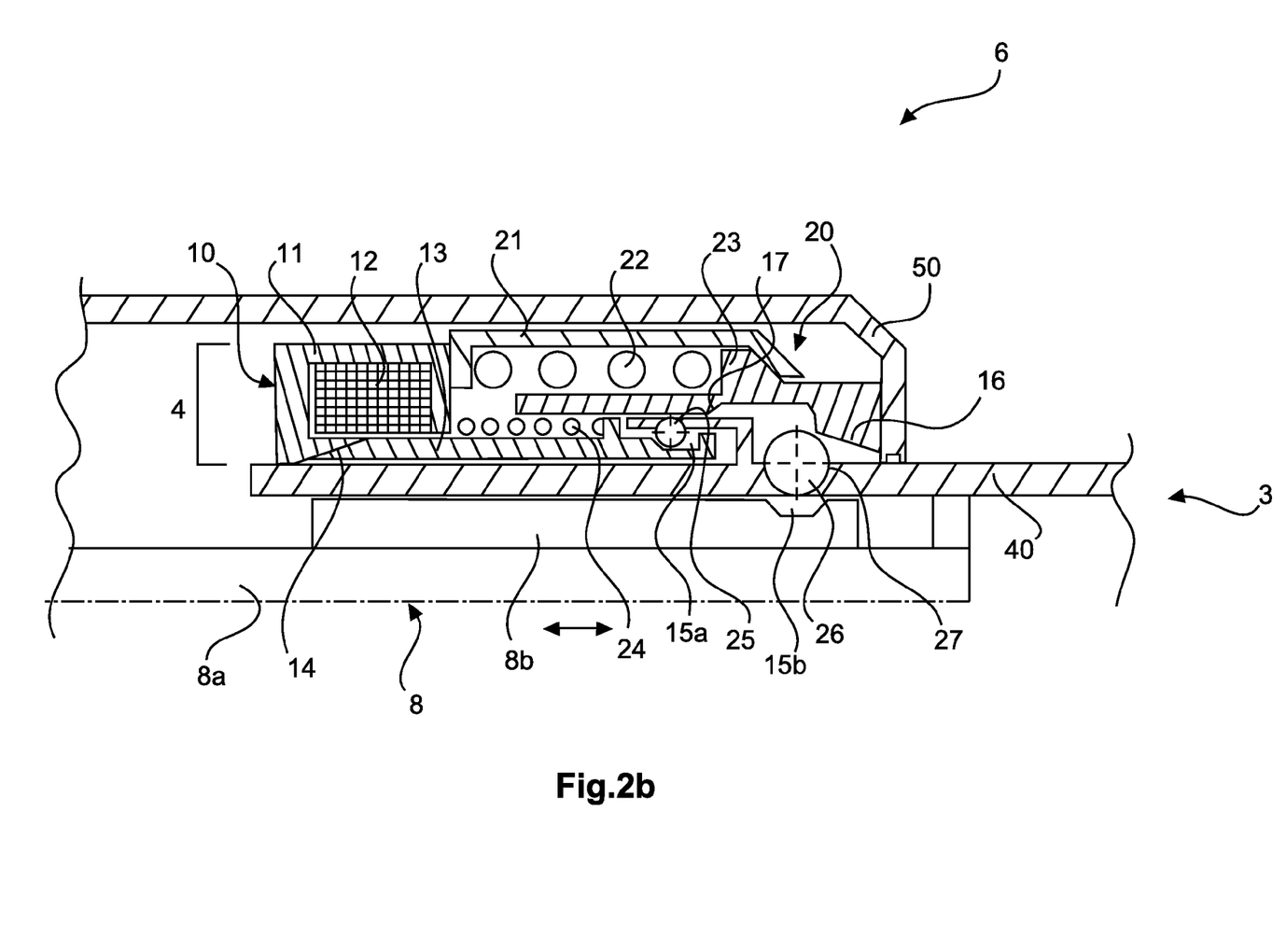
Figure 2C:
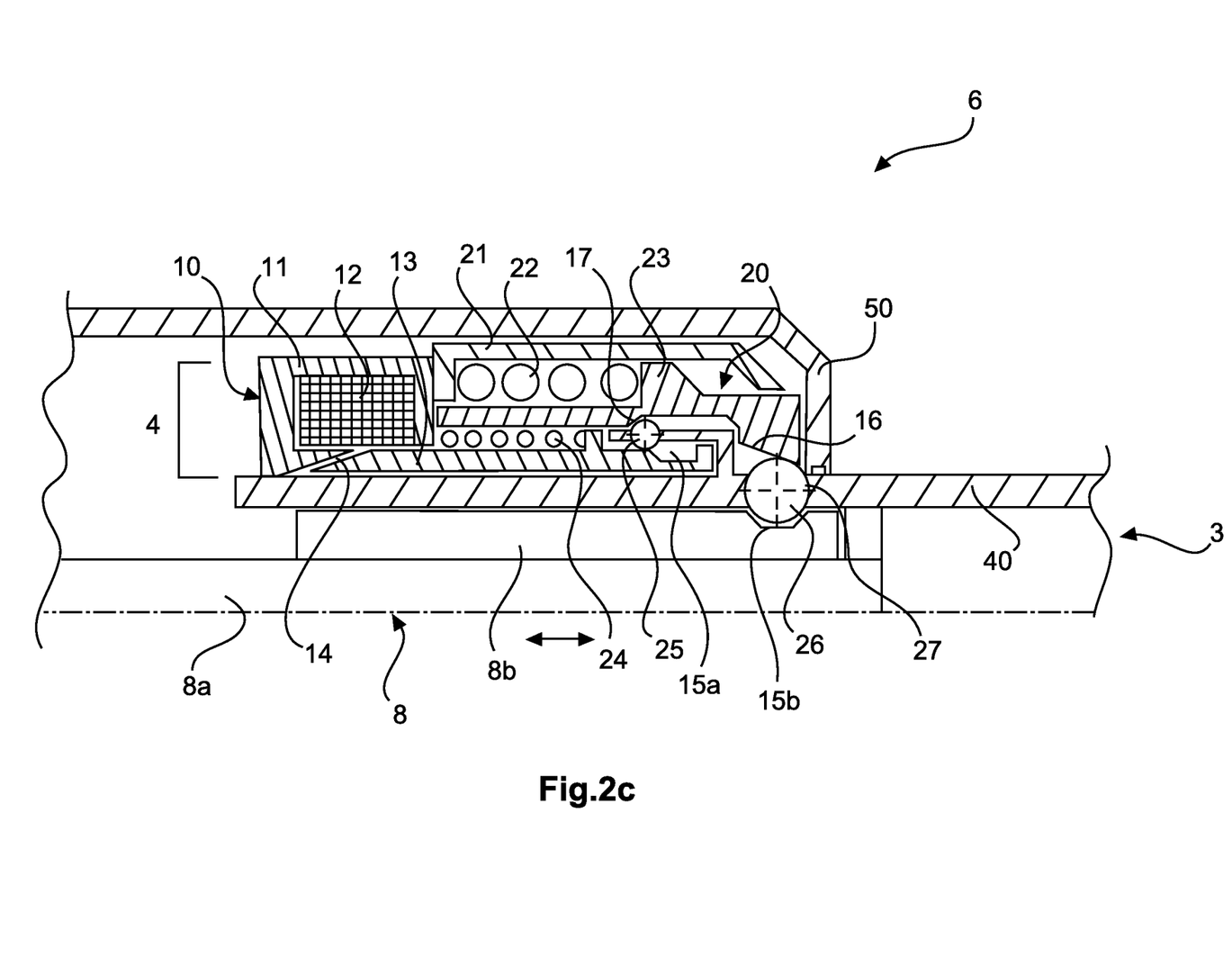

With further reference to FIGS. 2a-c, various states of an exemplary embodiment of a decoupling device according to the present invention are illustrated.

FIG. 2a illustrates the decoupling device 6 in a coupled state, thus in the normal mode of operation, in an exemplary maximally extended position of the actuator element 3 for controlled operation. FIG. 2b shows the decoupling device 6 in a decoupled state, with the actuator element 3 in the same position. FIG. 2c shows the decoupling device 6 in a re-coupled state, wherein the actuator element 3 was elongated therefor beyond its maximally self-assumable position, that is, its maximal position in controlled operation, by means of external power supply so that the energy store element 22 in the decoupling device 6 again stores the energy necessary for decoupling.

FIG. 2a shows an exemplary construction of an actuator element 3, comprising a drive unit 8, for example, a ball screw drive, having a first drive element 8a, a drive spindle, that is, a ball threaded spindle, and a second drive element 8b, for example, a spindle nut, that is, ball threaded nut. By rotating the first drive element 8a, the second drive element can be displaced thereon, by way of which an elongation, that is, a shortening of the actuator element 3 is provided. The connection points to be considered for the effective length are not illustrated in FIG. 2a and are located laterally outside the image area.

Decoupling device 6 with decoupling mechanism 4 is form-fittedly connected to the second drive element 8b. Decoupling mechanism 4 couples the output piston 40 form-fittedly to the second drive element 8b by utilizing the second form-fit element 26. Due to the output piston 40, which at its (not illustrated) end provides a connection point, is form-fittedly connected to the second drive element 8b utilizing the decoupling mechanism 4. Furthermore, the second actuator element 8b should be arranged, safeguarded from rotating, at the decoupling mechanism 4, that is, at the output piston 40 in order to provide, even in the decoupled state, a position change along the longitudinal axis, that is, the axis of rotation of the first drive element 8a by rotating the first drive element 8a. However, in the decoupled state, a displacement of output piston 40 on the second drive element 8b parallel to the axis of rotation of the first drive element 8a is to be possible so that the length of the actuator element 3 can be adjusted by way of a force that can be introduced from the outside.

The array according to FIG. 2a is thereby rotationally symmetrical design with respect to the rotational axis of the first drive element 8a. The decoupling mechanism 4 is provided with a first force element 24 and a second force element 22. The decoupling mechanism 4 is further provided with a first form-fit element 25 configured as small ball elements, and a second form-fit element 26 configured as big ball elements. A drive element 10 is provided, and electromagnet, for example, comprising a housing 11 that can be magnetized, a coil element 12, and an anchor element 13. In an idle state, thus in a non-energized state of the drive element 10, the first force element 24 is clamped between the magnetizable housing 11 and the anchor element 13, as a result of which the latter are shifted relative to one another, or are pressed apart so that an opening 14 is formed. Anchor element 13 is further provided with a recess 15a, into which the first form-fit element 25 can be moved. However, to this end, the drive element 10, or the electromagnet must be supplied with current so that in FIG. 2a, the anchor element 13 is pulled to the left in the direction of the magnetizable housing 11, as a result of which the opening 14 closes. In this way, an additional force is applied to the first force element 24, which is thus further compressed. As a result, the anchor element 13 slips such that the first form-fit element 25 can slide into the recess 15a. As a result thereof, the positive fit of the first form-fit element 25, with the adjusting sleeve 23, is released so that the energy stored in the second force element 22 can displace the adjusting sleeve, in FIG. 2a, to the right. By way of the positive fit of the first form-fit element 25, a blockage, that is, a positive fit of the adjusting sleeve 23 was provided, whereby the second force element 22 was prevented from releasing its energy and from displacing the adjusting sleeve 23 to the right. However, due to the first form-fit element 25 taking up its position in the recess 15a, this positive fit is released so that the second force element 22 can displace the adjusting sleeve to the right. As a result of the displacement of the adjusting sleeve 23, the second form-fit element 26, which was retained in the recess 15b, is released, its positive fit thus disengaged. With respect to FIG. 2a, this means that the second form-fit element 26 can veer in the direction of the outside of the actuator element 3, as a result of which the positive fit of the second drive element 8b and output piston 40, provided by the second form-fit element 26, is released so that the two elements 8b and 40 are displaceable with respect to one another but cannot be rotated. Elements 11 and 40 are illustrated as being connected so that a relative movement of the elements with respect to one another is avoided. As an alternative, elements 11 and 40 can be configured as one piece unit. Elements 21 and 11 may also be connected or be designed as a one-piece unit.

FIG. 2b now shows the decoupled state of the decoupling mechanism 4. The first form-fit element 25 is arranged in recess 15a whereas the second form-fit element 26 has been released from the recess 15b. Drive element 10 is/was energized so that the opening 14 is now closed. Due to the arrangement of the first form-fit element 25 in the recess 15a, the anchor element 13 cannot be moved again to the right due to the force of the first force element 24, as a result of which the position of the anchor element 13 in FIG. 2b is/would be maintained, even without further current feed to the drive element 10. Thus, a triggering of the decoupling can be provided by means of a comparatively short current pulse on the drive element 10, the duration of which is at least long enough for the adjusting sleeve 23 to move, by force action of the force element 22, so far to the right that the first form-fit element 25 can no longer move radially to the outside.

Compared to the arrangement of FIG. 2a, the second force element 22 is in an expanded state; it has thus used up its energy in order to move the adjusting sleeve 23, in FIG. 2b, to the right until with its shoulder, the latter adjoins the housing 21 of the decoupling mechanism. At the same time, the adjusting sleeve 23 also adjoins the housing 21. A suitably designed element, for example, a C-ring 27 with sleeve, retains the second form-fit element 26, thus preventing a free, that is, undefined mobility of the second form-fit element 26, in other words, holds the form-fit element 26 in the decoupled position.

In FIG. 2c, the process of the re-coupling of the actuator element 3, that is, the decoupling device 4 thereof is illustrated. In FIG. 2c, the maximal operative length of the actuator element 3 has been exceeded. By external power supply, the length of the actuator element 3, thus the spacing between the connection points has been stretched beyond the maximal operative length, thereby pressing the second form-fit element 26 across the inclined surface 16 of the adjusting sleeve 23 radially to the inside again in the direction of the second drive element 8b, and there in particular in the direction of the recess 15b. Prior thereto, the recess 15b can be moved into suitable position by way of rotating the first drive element 8a by force action of the motor element 1, and the translation of the second drive element 8b brought about as a result. In this way, the positive fit between the second drive element 8b and the decoupling device 6 is restored by the second form-fit element 26.

As a result of the displacement of the output piston 40 to the right, the decoupling mechanism connected thereto likewise moves to the right, initially without relative movement of the components of the decoupling mechanism. This is ensured such that drive unit 10 (except for anchor element 13) and housing 21 are translationally and rotationally fixed with respect to the output piston 40. If the output piston together with the decoupling mechanism thereby exceeds the control operating area and rightwardly enters the over-extended area, the end face of adjusting sleeve 23 strikes the housing 50 of the actuator element. Due to the displacement as a result of the impact, that is, the over-extension of the actuator element 3, the second force element 22 is re-compressed by means of the adjusting sleeve 23. Thus, the latter is once again supplied with energy, which is stored by the second force element 22 in order to be able to carry out a further, future decoupling process. Adjusting sleeve 23, particularly the inclined surface 17, are now once again in a position that allows a movement of the first form-fit element 25 radially to the outside. Due to the force effect of the first force element 24, and because the positive fit with the first form-fit element 25 is disengaged, the anchor element 13 is now moved to the right, which forms the gap 14 again and brings about a displacement of the first form-fit element 25 from the recess 15a. Due to the new position of anchor element 13, the position of the first form-fit element 25 is now fixed again such that by means of positive fit between the first form-fit element 25 and the inclined surface 17 of adjusting sleeve 23, the second force element 22 is fixed in its compressed form, even if the face end of adjusting sleeve 23 is no longer in contact with the housing 50 of the actuator element. Output piston 40 together with decoupling device 4 and the second drive element 8b can now be moved back into the control operating area by force effect of the motor unit in interaction with first drive element 8a, and the re-coupling process is completed.

Due to an anti-rotation safeguard between the output piston 40 and the second drive element 8b, the second drive element 8b can be moved, by rotating the first drive element 8a, on the latter in an axial direction, even in a decoupled state. It is particularly noted that in FIG. 2c, the actuator element 3 does not have a defect as such but a normal function of the drive unit 8, which continues to ensure the displaceability of the second drive element 8b by rotating the first drive element 8a thereon. For this reason, by rotating the first the drive element 8a, the second drive element 8b can also be moved into a position that technically exceeds the maximal functional length, in other words, is outside the control operating area of the actuator element, and only has to be assumed in order to facilitate the coupling of the decoupling device 6, thus bringing about the positive fit of the second form-fit element in the recess 15b. Thus, FIG. 2c illustrates a re-coupling of the decoupling device 6 after a completed test decoupling. After re-coupling, the actuator element 3 essentially makes the same functionality available as it did before the decoupling test.

An exemplary embodiment of an actuator array according to the present invention will now be described in connection with FIGS. 3a,b.

Figure 3A:
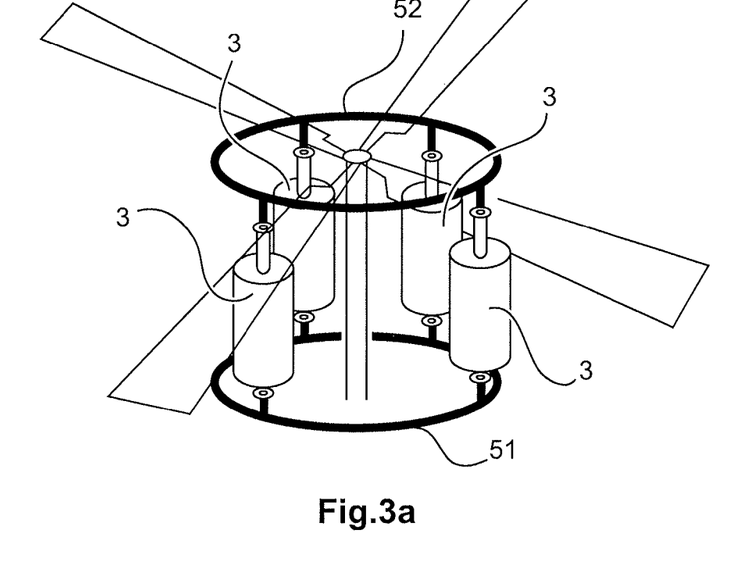
FIGS. 3a,b show an exemplary embodiment of an actuator array according to the present invention.
Figure 3B:
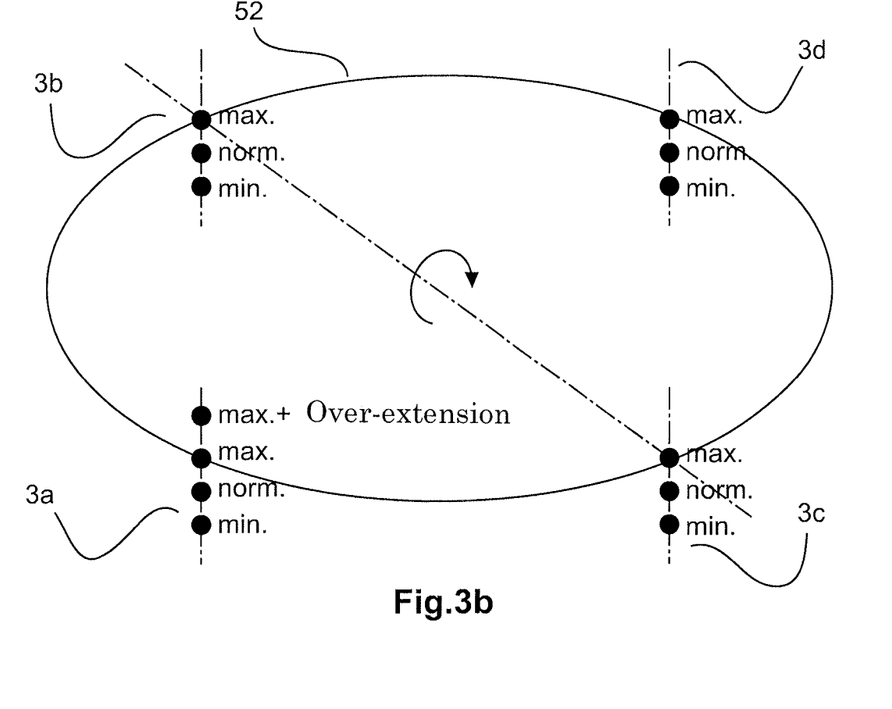

FIG. 3a shows a schematic array of four actuator elements 3a-d between an aircraft structure 51 and an aerodynamically effective element 52, a swash plate. Schematically indicated is the rotor of a helicopter having four rotor blades and axis of rotation. The tilting capability of the swash plate and the influencing of the pitch of the rotor blades of the helicopter resulting therefrom are not illustrated. Due to the four actuator elements 3a-d, the swash plate 52 can be freely adjusted with respect to its three degrees of freedom within the scope of the structural design. In principle, this adjustability is also ensured by three of the four actuator elements 3a-d.

Exemplarily, a test of an actuator element, for example, the actuator element 3a is carried out. The latter is thereby specifically decoupled in order to find out if the decoupling device 6 is functioning flawlessly, and if the actuator element may decouple in the event of an error so that by means of external power supply, it can be adjusted as to its length by the remaining three actuator elements, and thus the functional capability of the remaining three actuator elements, and thus does not diminish the positioning ability of the swash plate. After the decoupling within the framework of the test, actuator element 3a is to be re-coupled. To this end, as illustrated in FIG. 3b, all actuator elements 3 are moved to their maximal position. Actuator element 3a is actuated such that its drive element 8a comes to lie in the over-extended area, as illustrated in FIG. 2c. This is possible, despite the executed decoupling, because said actuator element 3a, based on the test scenario, is not defective, as a result of which the drive unit 8 thereof is functional and continues to allow a displacement of the second drive element 8b on the first drive element 8a. After all actuator elements 3a-d have been moved to their maximal position, the actuator elements 3b and 3c are exemplarily actuated such that they maintain their position, the maximal position. The actuator elements 3b,c thus form an axis of rotation, that is, tilting axis for swash plate 52. Actuator element 3d is now retracted from its maximum position, as a result of which the swash plate 52 rotates about the axis of rotation between actuator elements 3b and 3c. This results in a lever action, and actuator element 3a is over-extended mechanically from the outside beyond its maximal operative length. This over-extension corresponds to the process according to FIG. 2c. For the re-coupling, each actuator 3 has an additional stroke (max.+over-extension), which is now utilized such that the actuator is over-extended and re-coupled. This over-extension is used for the resetting of the energy store, the second force element 22 in actuator element 3a. According to the processes described with reference to FIG. 2c, the decoupling device 6 is re-coupled in this way. Thus, actuator element 3a can be used again in a regular manner. Next, a comparable test for actuator elements 3b, 3c, and 3d can be carried out, whereby after a completed test run, the decoupling device 6 of each actuator element 3a-d has been tested.

Figure 4A:
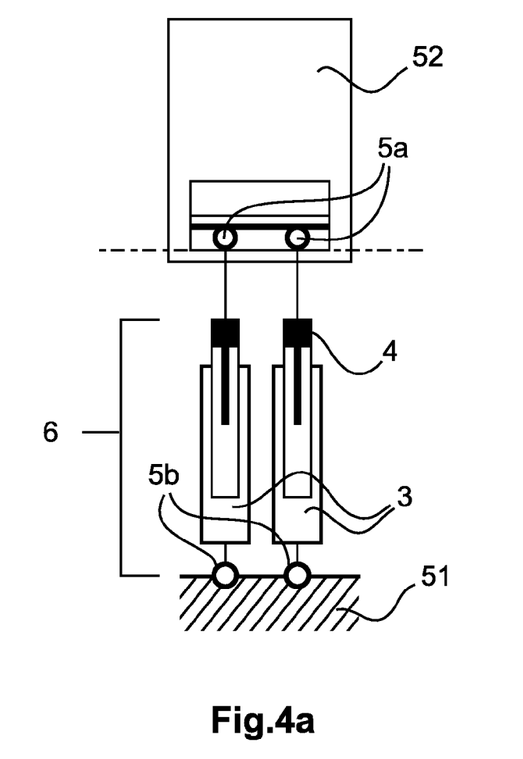
FIGS. 4a,b show exemplary embodiments of actuator elements, that is, an actuator array according to the present invention.
Figure 4B:
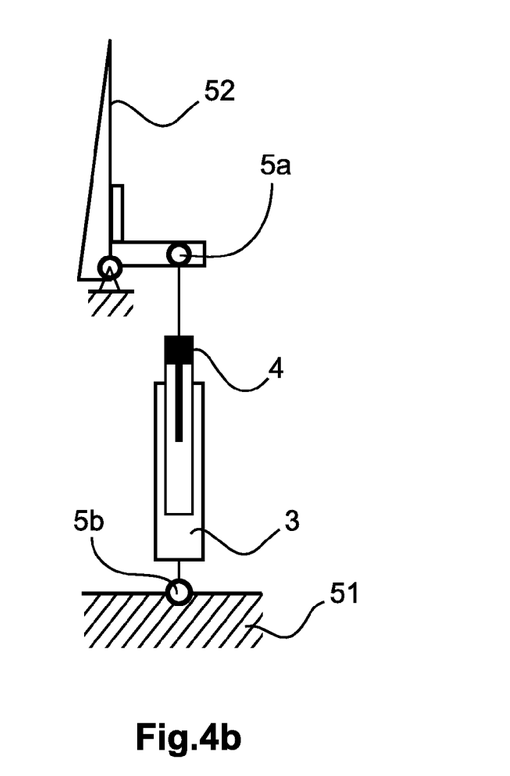

FIGS. 4a,b exemplarily show the use of an actuator array 60 according to the invention for actuating an aerodynamically effective surface 52 of an airplane. This can be a control surface, for example, or a surface of the wings influencing the buoyancy. The actuator array 60 comprises two force-parallel or effect-parallel arranged actuator elements 3, which are mounted on a fixed point of the plane structure 51 on the one hand, and on the other hand, are in contact with the aerodynamically effective element 52. By way of a suitable lever mechanism, an angular position of the aerodynamically effective element 52 can be adjusted by lengthening or shortening the actuator array 60. Each actuator element 3 is thereby provided with a drive unit having a first drive element and a second drive element, which, however, is not illustrated in detail in FIGS. 4*a, b*. Each actuator element 3 with its drive units can be adjusted individually, to assume a certain length extension, thus adjusting a distance between the connection points 5*a* and 5*b*. With reference to FIG. 4*b*, if actuator 3 is lengthened, the aerodynamically effective surface 52 tilts to the left due to the lever, whereas with a shortening of the actuators 3, it tilts to the right. As can be appreciated from FIG. 4*a*, the two actuator elements 3 of actuator array 60 are connected parallel between airplane structure 51 and aerodynamically effective element 52. Thus, each actuator element 3 by itself may achieve an angular inclination of the aerodynamically effective surface 52, or they can jointly act upon the aerodynamically effective surface 52.

In the event that only one of the actuator elements 3 is defective in such a way that a blockage of its drive unit results therefrom, the second, effect parallel arranged actuator element 3 would also be blocked since the defective actuator element then essentially constitutes a rigid connection with fixed length so that an inclination of the aerodynamically effective element 20*a* by the respective other, still functional actuator 3 could not be adjusted. For this reason, a decoupling mechanism 4 is provided for each actuator element 3. Each decoupling mechanism 4 of an actuator element 3 can be activated individually controlled so that the then decoupled actuator 3 can be lengthened or shortened, essentially with little external expenditure of force particularly introduced by way of the connection points 5*a,b*.

Thus, a defective actuator element 3 with decoupled decoupling mechanism 4 can be force-technically deactivated such that the adjustment of the aerodynamically effective element 52 may be done exclusively by the still functional actuator 3. Since only one actuator element 3 may be decoupled at any one time, decoupling device 6 may be configured to initiate only one single decoupling process so that merely one decoupling mechanism 4 of the actuator elements 3 can be decoupled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 motor element
2*a,b* motor shaft, transmission
3 actuator element
4 decoupling mechanism
5*a,b* connection points; engagement points
6 decoupling device
8 drive unit/ball screw/ball screw drive
8*a* first drive element/drive spindle/ball threaded spindle
8*b* second drive element/spindle nut/ball threaded nut
10 drive element/electromagnet
11 magnetizable housing
12 coil element
13 anchor element
14 opening, gap
15*a,b* recess
16 inclined surface
17 inclined surface
20 mechanism of the decoupling device
21 housing
22 second force element/pressure spring/energy store element
23 sleeve element/adjusting sleeve
24 first force element/pressure spring
25 first form-fit element/small ball element
26 second form-fit element/big ball element
27 C-rings with sleeve
40 output piston
50 housing
51 aircraft
52 swash plate/aerodynamically effective surface
60 actuator array

What is claimed is:

1. A reversible decoupling device for an actuator element having a drive unit, which includes first and second actuator drive elements configured to functionally interact to change a length of the actuator element, the reversible decoupling device comprising:
   decoupling mechanism, which comprises
      a decoupling drive element;
      a first force element;
      a second force element;
      a first form-fit element; and
      a second form-fit element;
   wherein the first force element is configured to hold the first form-fit element in a closed position;
   wherein the decoupling drive element is configured to move the first form-fit element from the closed position to a form-fit released position;
   wherein the second force element is configured to move the second form-fit element from a closed position to a form-fit released position;
   wherein the second force element is blocked by a positive fit of the first form-fit element such that the second form-fit element cannot be moved to the form-fit released position; and
   wherein the second force element is configured to move the second form-fit element to the form-fit released position in which a positive fit of the first form-fit element is released;
   wherein the decoupling mechanism is configured to decouple an output piston from one of the first and second actuator drive elements so that the change in length of the actuator element is achievable independently of the drive unit and without decoupling the first drive element and the second drive element.

2. The decoupling device of claim 1, wherein the decoupling drive element is configured to counteract the first force element.

3. The decoupling device of claim 1, wherein in the closed position the second form-fit element provides a positive fit between one of the first and second actuator drive elements and the output piston.

4. The decoupling device of claim 1, wherein
   the drive element is an electromagnetic drive element;
   the first force element is a spring element;
   the second force element is a spring element;
   the first form-fit element is a ball element; and/or
   the second form-fit element is a ball element.

5. An actuator element, comprising:
a first drive unit comprising first and second actuator drive elements configured to functionally interact to change a length of the actuator element; and
decoupling mechanism, which comprises
a decoupling drive element;
a first force element;
a second force element;
a first form-fit element; and
a second form-fit element;
wherein the first force element is configured to hold the first form-fit element in a closed position;
wherein the decoupling drive element is configured to move the first form-fit element from the closed position to a form-fit released position;
wherein the second force element is configured to move the second form-fit element from a closed position to a form-fit released position;
wherein the second force element is blocked by a positive fit of the first form-fit element such that the second form-fit element cannot be moved to the form-fit released position; and
wherein the second force element is configured to move the second form-fit element to the form-fit released position in which a positive fit of the first form-fit element is released;
wherein the decoupling mechanism is configured to decouple an output piston from one of the first and second actuator drive elements so that the change in length of the actuator element is achievable independently of the drive unit and without decoupling the first drive element and the second drive element.

6. The actuator element of claim 5, wherein
the actuator element includes two connection points, wherein a distance between the first and second connection points is adjustable by way of the length change of the actuator element;
one of the first and second drive elements is connected to one of the two connection points; and
the output piston is connected to the other one of the two connection points.

7. The actuator element of claim 6, wherein
in the coupled state of the decoupling device the distance of the two connection points is adjustable by means of the actuator element; and
in the decoupled state of the decoupling device the distance of the two connection points is adjustable by a force applied to the two connection points from outside of the actuator element.

8. The actuator element of claim 5, wherein the actuator element has a minimal and/or maximal length that the actuator element can assume during regular operation using its own drive unit, and
wherein
in a decoupled state the actuator element is shortenable beyond the minimal length by external power supply; and/or
in a decoupled state the actuator element is lengthenable beyond the maximal length by external power supply; and
wherein the decoupling device is configured such that in a shortened or extended length due to external power supply, the decoupling device is transitionable from the decoupled state to the coupled state.

9. The actuator element of claim 8, wherein due to the external power supply, the second force element is transitionable from a first, expanded state, in which the positive fit of the second form-fit element is released, to a second, compressed state, in which second, compressed state the second form-fit element is transitionable into the closed position.

10. The actuator element of claim 5, wherein
the drive unit is a ball screw drive; and
the first drive element and the second drive element are drive spindle and ball screw nut, respectively, of the ball screw drive.

11. An actuator array, comprising:
four actuator elements arranged in a force-parallel manner,
wherein the four actuator elements are arranged to jointly provide a position interference in three degrees of freedom of an aerodynamically effective element,
wherein each of the four actuator elements comprises
a first drive unit comprising first and second actuator drive elements configured to functionally interact to change a length of the actuator element; and
decoupling mechanism, which comprises
a decoupling drive element;
a first force element;
a second force element;
a first form-fit element; and
a second form-fit element;
wherein the first force element is configured to hold the first form-fit element in a closed position;
wherein the decoupling drive element is configured to move the first form-fit element from the closed position to a form-fit released position;
wherein the second force element is configured to move the second form-fit element from a closed position to a form-fit released position;
wherein the second force element is blocked by a positive fit of the first form-fit element such that the second form-fit element cannot be moved to the form-fit released position; and
wherein the second force element is configured to move the second form-fit element to the form-fit released position in which a positive fit of the first form-fit element is released;
wherein the decoupling mechanism is configured to decouple an output piston from one of the first and second actuator drive elements so that the change in length of the actuator element is achievable independently of the drive unit and without decoupling the first drive element and the second drive element.

12. The actuator array of claim 11, wherein
in the event of a defect of a drive unit of one of the actuator elements, the decoupling mechanism of the actuator element is triggerable by the decoupling device so that the actuator element is functionally decoupled;
the three-dimensional position interference of the aerodynamically effective element continues to be provided by at least another one of the actuator elements.

13. The actuator array of claim 11, wherein the actuator array is arranged on an airplane or helicopter.

* * * * *